United States Patent
Hirosawa et al.

(10) Patent No.: US 9,456,125 B2
(45) Date of Patent: Sep. 27, 2016

(54) FOCUS DETECTION APPARATUS AND METHOD

(71) Applicant: CANON KABUSHIKI KAISHA, Tokyo (JP)

(72) Inventors: Tomokuni Hirosawa, Kawasaki (JP); Takayuki Shu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 14/670,101

(22) Filed: Mar. 26, 2015

(65) Prior Publication Data
US 2015/0281557 A1    Oct. 1, 2015

(30) Foreign Application Priority Data

Mar. 28, 2014   (JP) .................. 2014-070085

(51) Int. Cl.
| | |
|---|---|
| H04N 5/232 | (2006.01) |
| H04N 5/235 | (2006.01) |
| H04N 5/225 | (2006.01) |
| G02B 7/34 | (2006.01) |
| G02B 7/36 | (2006.01) |
| G03B 13/36 | (2006.01) |

(52) U.S. Cl.
CPC ............ *H04N 5/23212* (2013.01); *G02B 7/34* (2013.01); *G02B 7/36* (2013.01); *G03B 13/36* (2013.01); *H04N 5/2258* (2013.01); *H04N 5/2352* (2013.01); *H04N 5/2353* (2013.01)

(58) Field of Classification Search
CPC .. H04N 5/2351; H04N 5/2352; H04N 5/243; G02B 7/34–7/346; G03B 13/36
See application file for complete search history.

(56) References Cited

U.S. PATENT DOCUMENTS

2011/0134286 A1*  6/2011  Inoue ................. H04N 5/23212
                                                            348/241

FOREIGN PATENT DOCUMENTS

| JP | 11-150686 A | 6/1999 |
|---|---|---|
| JP | 3854704 B2 | 12/2006 |

* cited by examiner

*Primary Examiner* — Paul Berardesca

(74) *Attorney, Agent, or Firm* — Cowan, Liebowitz & Latman, P.C.

(57) ABSTRACT

A focus detection apparatus comprises: a sensor unit, having a plurality of photoelectric conversion elements for receiving light that passed through an imaging optical system and accumulating charge, configured to generate an image signal to be used for correlation calculation for focus detection based on the accumulated charge; a control unit configured to control the photoelectric conversion elements to stop charge accumulation in a case where a first signal that represents contrast of the image signal reaches a predetermined voltage level; and a voltage level setting unit. The voltage level setting unit sets a larger voltage level in a first case, in which luminance change in a direction of the correlation calculation in the plurality of the photoelectric conversion elements is gentler than a second case, than in the second case.

21 Claims, 15 Drawing Sheets

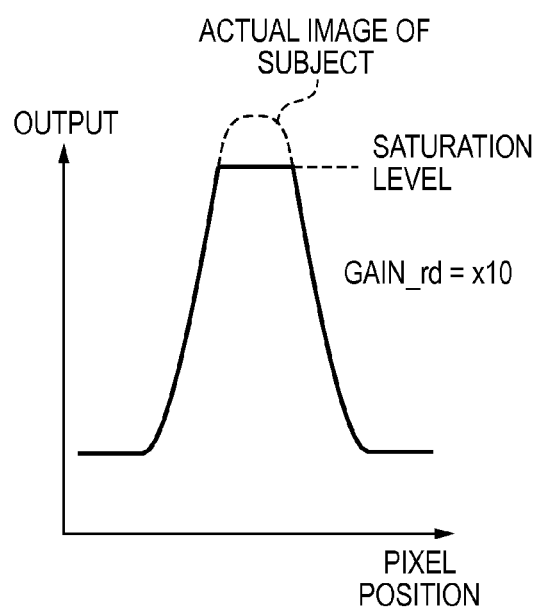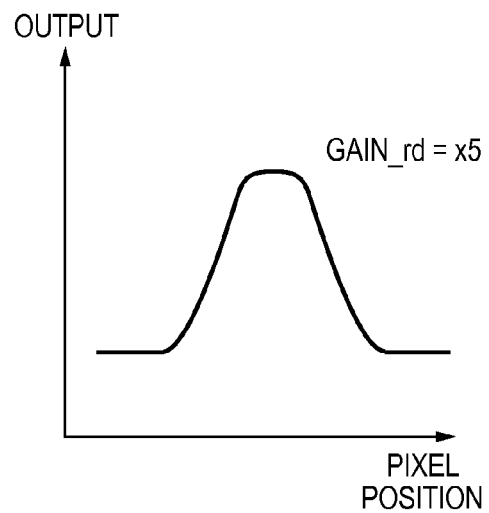
F I G. 13A    F I G. 13B

FOCUS DETECTION APPARATUS AND METHOD

BACKGROUND OF THE INVENTION

1. Field of the Invention

The present invention relates to a focus detection apparatus and method used for automatic focus detection.

2. Description of the Related Art

Conventionally, a variety of cameras or the like having a so-called automatic focusing (AF) function have been suggested. The AF function is to automatically focus on a subject by detecting a focus state of the subject and then changing a position of an imaging lens in response to the detected focus state. In a method of detecting a focus state, a camera or the like having the AF function makes a subject image be formed on an image sensor comprising a plurality of pixels which include photoelectric converters. Then, a plurality of pixel signals output from the image sensor are subjected to a predetermined calculation, thereby the focus state is detected (See Japanese Patent Laid-Open No. 11-150686).

In this method, in order to detect focus states of subjects having different luminance levels, from a subject with high luminance to a subject with low luminance, at high precision, it is necessary to properly control a gain used for reading out a signal and a charge accumulation period in an image sensor. This is because, if the level of an image signal of the subject formed from a plurality of pixel signals is too large, the levels of some pixel signals that can be processed in the apparatus may exceed a saturation level, the resultant image signal may be apart from an image signal that properly represents the subject, which results in deterioration of precision. On the contrary, if the level of the image signal is too small, a noise in the image signal relatively increases, which may cause deterioration of precision.

On the other hand, a phase difference detection method is well-known in general as an automatic focus detection method for cameras. With the phase difference detection method, a light flux that comes from a subject and has passed through different exit pupil areas of an imaging lens are caused to form an image on a pair of line sensors of photoelectric conversion devices (AF sensors) for focus detection. The focus state of the imaging lens is detected by calculating relative positions of a pair of subject images obtained by performing photoelectric conversion with the pair of line sensors (hereinafter referred to as "phase difference calculation"). Recently, various kinds of AF sensors have been proposed in which a plurality of line sensor pairs are arranged such that focus states of a plurality of areas in a screen can be detected.

For example, Japanese Patent No. 3854704 discloses the following control. That is to say, photoelectric conversion elements are arranged at positions corresponding to a plurality of focus detection areas, accumulation time is controlled for respective areas 1 to n by sequentially circulating through and monitoring the area 1 to the area n, and the gain at the time of reading out a pixel signal is appropriately controlled for each area. The pixel signal can be read out with an appropriate gain even when the subject has different luminance levels, by appropriately controlling charge accumulation for each area.

In the conventional technique as disclosed in Japanese Patent Laid-Open No. 11-150686, accumulation is controlled so that responsiveness and focus detection precision are both satisfied using a PB signal which indicates a difference between the maximum value and minimum value of an image signal of the subject. However, if the PB signal of the subject is sufficient but the sharpness of the subject is small, focus detection precision deteriorates.

Further, with the focus detection apparatus using the photoelectric conversion device disclosed in Japanese Patent No. 3854704, the circulation cycle is lengthened, possibly resulting in a delay of accumulation end timing. For example, in the case where the luminance of a subject has changed and become brighter while signals of other areas are monitored, in some cases accumulation is not stopped properly, and charge may be accumulated to a level that exceeds a dynamic range of an output circuit of an AF sensor and a dynamic range of an AD converter (saturation). Further, in the case where a subject has a super-high luminance, accumulation end control is not made in time, and in some cases a pixel signal of the super-high luminance area may saturate. If the focus detection calculation is performed using the saturated signals, focus detection precision may deteriorate.

SUMMARY OF THE INVENTION

The present invention has been made in consideration of the above situation, and is to improve precision of focus detection when sharpness of a subject is small. Further, the present invention is to perform focus detection with high precision for high luminance subject.

According to the present invention, provided is a focus detection apparatus comprising: a sensor unit, having a plurality of photoelectric conversion elements for receiving light that passed through an imaging optical system and accumulating charge, configured to generate an image signal to be used for correlation calculation for focus detection based on the accumulated charge; a control unit configured to control the photoelectric conversion elements to stop charge accumulation in a case where a first signal that represents contrast of the image signal reaches a predetermined voltage level; and a voltage level setting unit configured to set the predetermined voltage level, wherein the voltage level setting unit sets a larger voltage level as the predetermined voltage level in a first case, in which luminance change in a direction of the correlation calculation in the plurality of the photoelectric conversion elements is gentler than a second case, than in the second case.

Further, according to the present invention, provided is a focus detection apparatus comprising: a sensor unit, having a plurality of photoelectric conversion elements for receiving light that passed through an imaging optical system and accumulating charge, configured to generate an image signal to be used for correlation calculation for focus detection based on the accumulated charge; an amplification unit configured to amplify the image signal generated by the sensor unit; a control unit configured to control the photoelectric conversion elements to stop charge accumulation in a case where a first signal that represents contrast of the image signal amplified by the amplification unit reaches a predetermined voltage level; and a gain setting unit configured to set a gain for the image signal in the amplification unit, wherein the gain setting unit sets a smaller gain in a first case, in which luminance change in a direction of the correlation calculation in the plurality of photoelectric conversion elements is gentler than a second case, than in the second case.

Furthermore, according to the present invention, provided is a focus detection method comprising: a generation step of generating an image signal to be used for correlation calculation for focus detection based on charge accumulated in a plurality of photoelectric conversion elements for receiving light that passed through an imaging optical system and accumulating charge; a control step of controlling the photoelectric conversion elements to stop the charge accumulation in a case where a first signal that represents contrast of the image signal reaches a predetermined voltage level; and a voltage level setting step of setting the predetermined voltage level, wherein the voltage level setting step sets a larger voltage level as the predetermined voltage level in a first case, in which a luminance change in a direction of the correlation calculation in the plurality of photoelectric conversion elements is gentler than a second case, than in the second case.

Further, according to the present invention, provided is a focus detection method comprising: a generation step of generating an image signal to be used for correlation calculation for focus detection based on charge accumulated in a plurality of photoelectric conversion elements for receiving light that passed through an imaging optical system and accumulating charge; an amplification step of amplifying the image signal generated in the generation step; a control step of controlling the photoelectric conversion elements to stop the charge accumulation in a case where a first signal that represents contrast of the image signal amplified in the amplification step reaches a predetermined voltage level; and a gain setting step of setting a gain for the image signal to be used in the amplification step, wherein the gain setting step sets a smaller gain in a first case, in which a luminance change in a direction of the correlation calculation in the plurality of photoelectric conversion elements is gentler than a second case, than in the second case.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 13A and 13B are graphs showing examples of pixel signals when a gain is reset according to the embodiment;

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
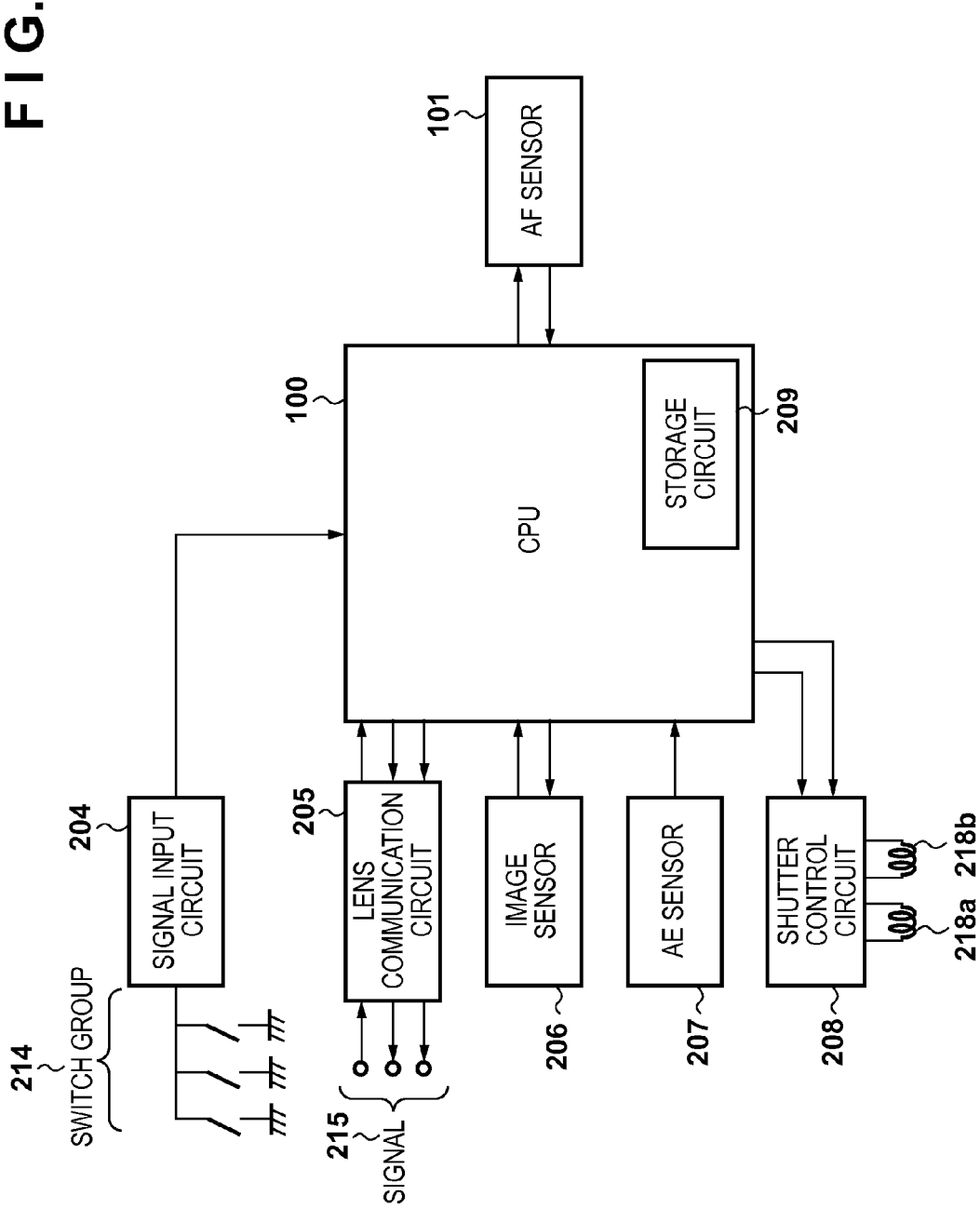
FIG. 1 is a block diagram showing a schematic configuration of a camera body according to an embodiment of the present invention.

FIG. 1 is a block diagram showing a schematic configuration of a camera body equipped with a focus detection sensor according to a first embodiment of the present invention.

Figure 2:
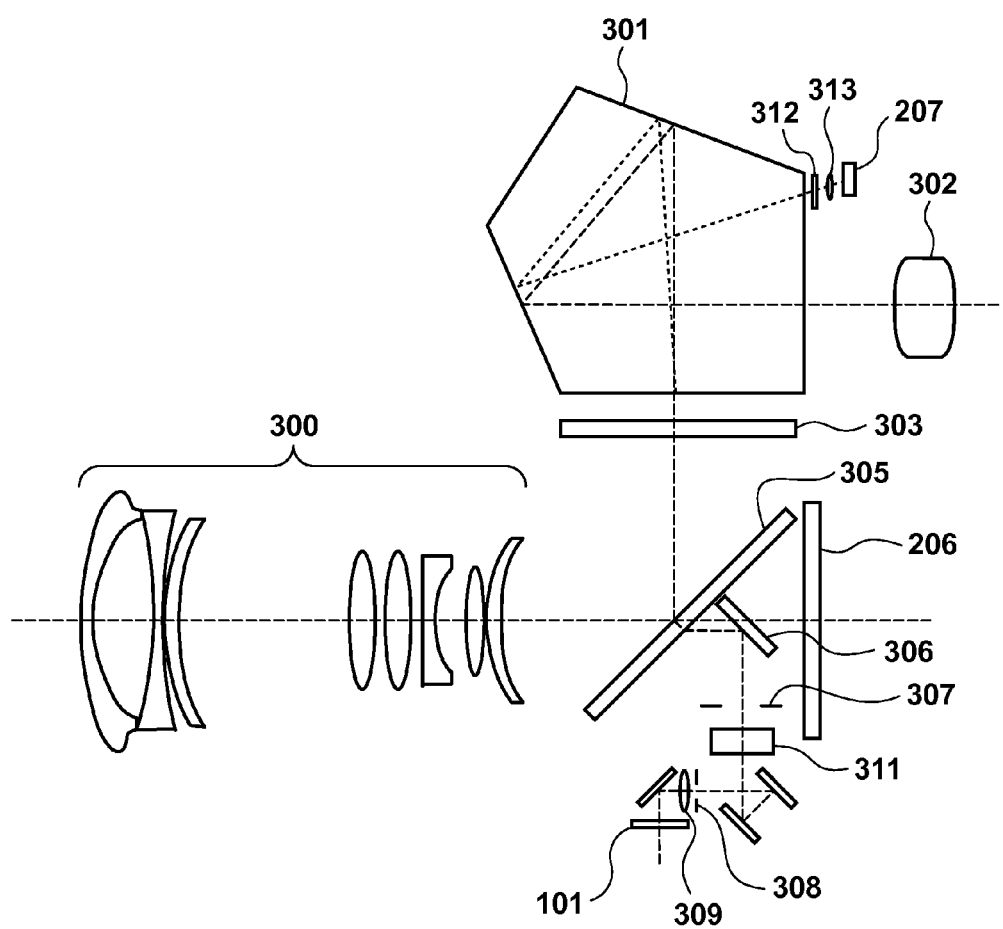
FIG. 2 is a diagram showing a configuration of an optical system of the camera.

A camera microcomputer (CPU) 100 is connected to a signal input circuit 204 for detecting operation on a switch group 214 for various operations in the camera, an image sensor 206 constituted by a CMOS sensor, a CCD, or the like, an AE sensor 207, a shutter control circuit 208 for controlling shutter magnets 218a and 218b, and an AF sensor 101. A signal 215 is transmitted between the CPU 100 and an imaging lens 300, which is shown in FIG. 2 and will be described later, via a lens communication circuit 205 in order to control the focus position and a diaphragm. The operation of the camera is determined by a photographer operating the switch group 214. The switch group 214 includes a release button, a dial for selecting a focus detection area, and the like.

The AF sensor 101 is provided with a plurality of line sensor pairs, and can obtain a pair of image signals having a parallax with respect to each other from each line sensor pair, as a result of the CPU 100 controlling the AF sensor 101. The AF sensor 101 then detects a focus state from a phase difference between the obtained pair of image signals, and controls the focus position of the imaging lens 300.

The CPU 100 also detects the luminance of a subject by controlling the AE sensor 207, and determines the f-number of the imaging lens 300 and the shutter speed. The CPU 100 then controls the f-number of the imaging lens 300 via the lens communication circuit 205, controls the shutter speed by adjusting energizing time of the magnets 218a and 218b via the shutter control circuit 208, and further performs an image sensing operation by controlling the image sensor 206.

The CPU 100 contains a storage circuit 209 such as a ROM that stores programs for controlling camera operations, a RAM for storing variables, and an EEPROM (Electronically Erasable Programmable Read Only Memory) for storing various parameters.

Next, a configuration of an optical system of the camera will be described with reference to FIG. 2. Most of incident light beams that come from the subject via the imaging lens 300 is reflected upward by a quick return mirror 305 and caused to form a subject image on a finder screen 303. The photographer can observe this image via a pentaprism 301 and an eyepiece 302.

A part of the light beams that have entered the pentaprism 301 is caused to form an image on the AE sensor 207 via an optical filter 312 and an image forming lens 313. The subject luminance can be measured by processing an image signal obtained by performing photoelectric conversion on this image.

Another part of the light beams from the subject is transmitted through the quick return mirror 305, turned downward by a rear sub-mirror 306, and caused to form an image on the AF sensor 101 after passing through a visual field mask 307, a field lens 311, a diaphragm 308, and a secondary image forming lens 309. A focus state of the imaging lens 300 can be detected by processing an image signal obtained by performing photoelectric conversion on this image. At the time of photographing, the quick return mirror 305 and the sub-mirror 306 jump up and withdraw from the optical path, and all incident light beams are thereby caused to form an image on the image sensor 206, and the subject image is exposed.

In FIG. 2, a well-known phase difference detection method is used as the focus detection method in the focus detection apparatus according to the present embodiment, which is constituted by the AF sensor 101 and the optical system that covers from the visual field mask 307 to the secondary imaging lens 309. Focus states of a plurality of different areas within the screen can be detected.

Figure 3:
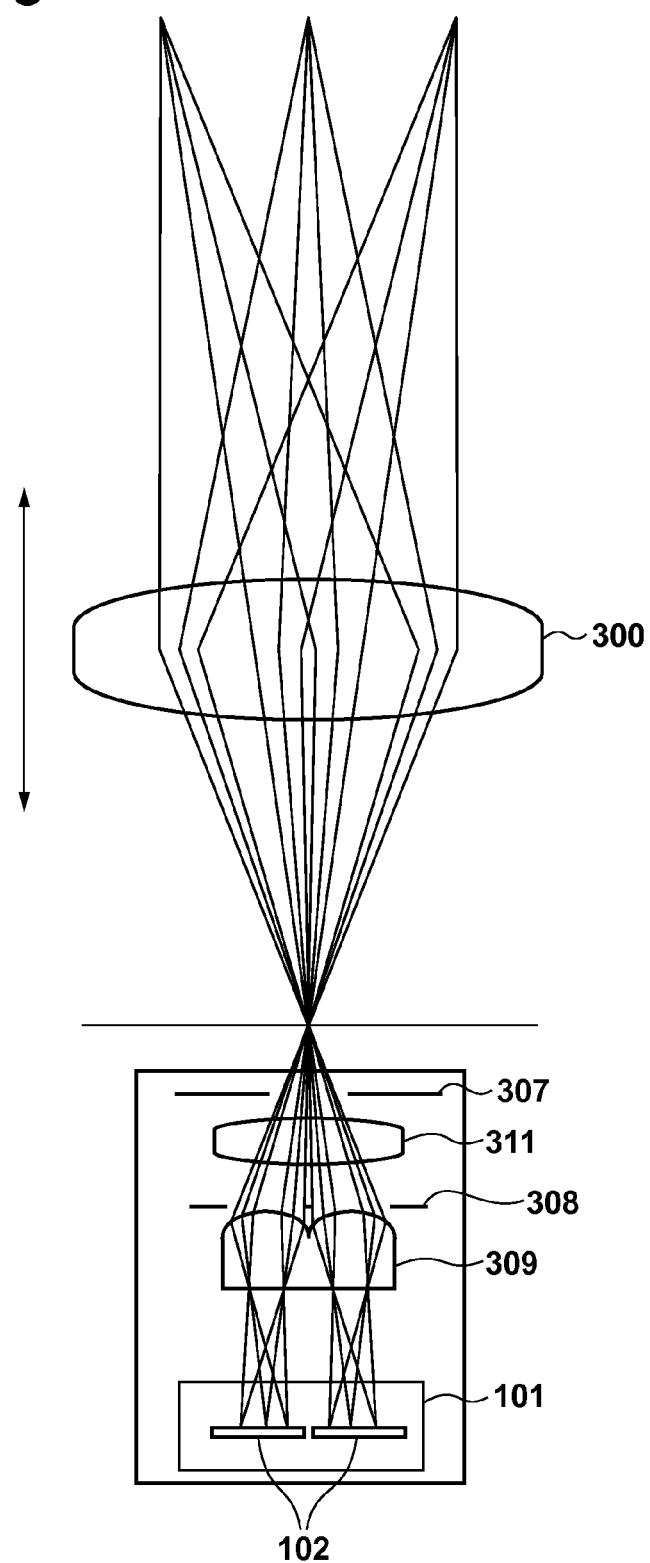
FIG. 3 is a diagram showing a detailed configuration of a focus detection optical system within the optical system shown in FIG. 2.

A specific configuration of the optical system related to the focus detection is shown in FIG. 3. The light beams from the subject that have passed through the imaging lens 300 are reflected by the sub-mirror 306 as described above with reference to FIG. 2, and temporarily caused to form an image in the vicinity of the visual field mask 307 located on a surface conjugate with respect to an imaging surface. Note that the imaging lens 300 is expressed by one lens for the sake of convenience in FIG. 3, however, it is actually comprised of a plurality of lenses. In FIG. 3, the optical paths that are reflected by the sub-mirror 306 and thus turned back are shown in an expanded manner. The visual field mask 307 is a member for blocking unnecessary light that enters areas other than the focus detection areas in the screen.

The field lens 311 has an effect of projecting an image of each aperture of the diaphragm 308 near the exit pupil of the imaging lens 300. The secondary image forming lens 309 is arranged in the rear of the diaphragm 308 and constituted by a pair of lenses, which correspond to the respective apertures of the diaphragm 308. The light flux that have passed through the visual field mask 307, the field lens 311, the diaphragm 308, and the secondary image forming lens 309 forms an image on the line sensors in the AF sensor 101. Although FIG. 3 shows only a pair of the line sensors in the AF sensor 101, multiple pairs of the line sensors are arranged, as will be described later.

Next, a relationship between the line sensors in the AF sensor 101 and focus detection areas within a photographic screen will be described with reference to FIGS. 4 and 5.

Figure 4:
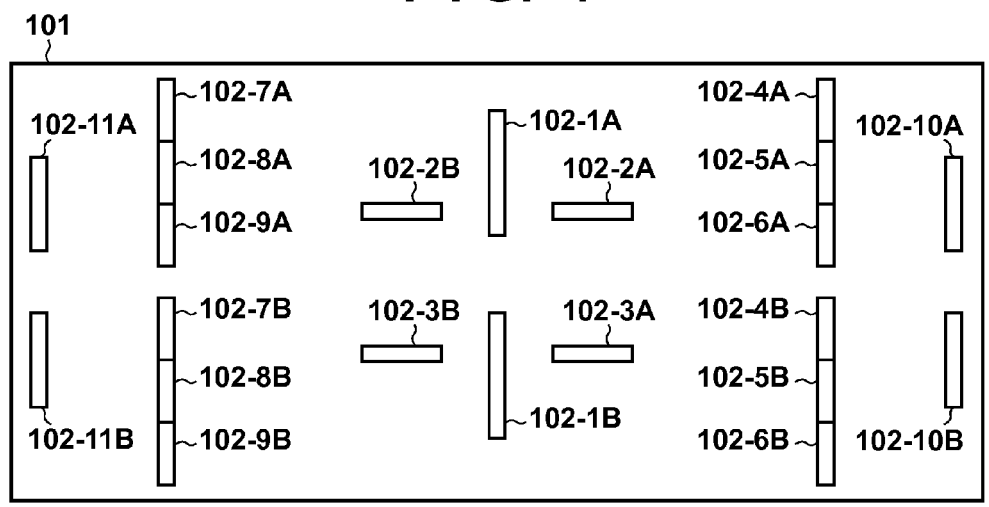
FIG. 4 is a diagram showing an arrangement of line sensors according to an embodiment.

FIG. 4 is a diagram showing an exemplary arrangement of the line sensor pairs in the AF sensor 101. Each of the line sensor pairs 102-1 to 102-11 is constituted by a pair of line sensors, and detects a focus state based on a phase difference between a pair of signals obtained by the line sensor pair. For example, the line sensor pair 102-1 is constituted by a line sensor 102-1A and a line sensor 102-1B. Each line sensor pair detects a phase difference between two images that are output from the line sensor pair as a result of substantially the same area of the subject being projected on the line sensor pair by a focus detection optical system such as the secondary imaging lens 309, and can thereby detect the focus state.

Figure 5:
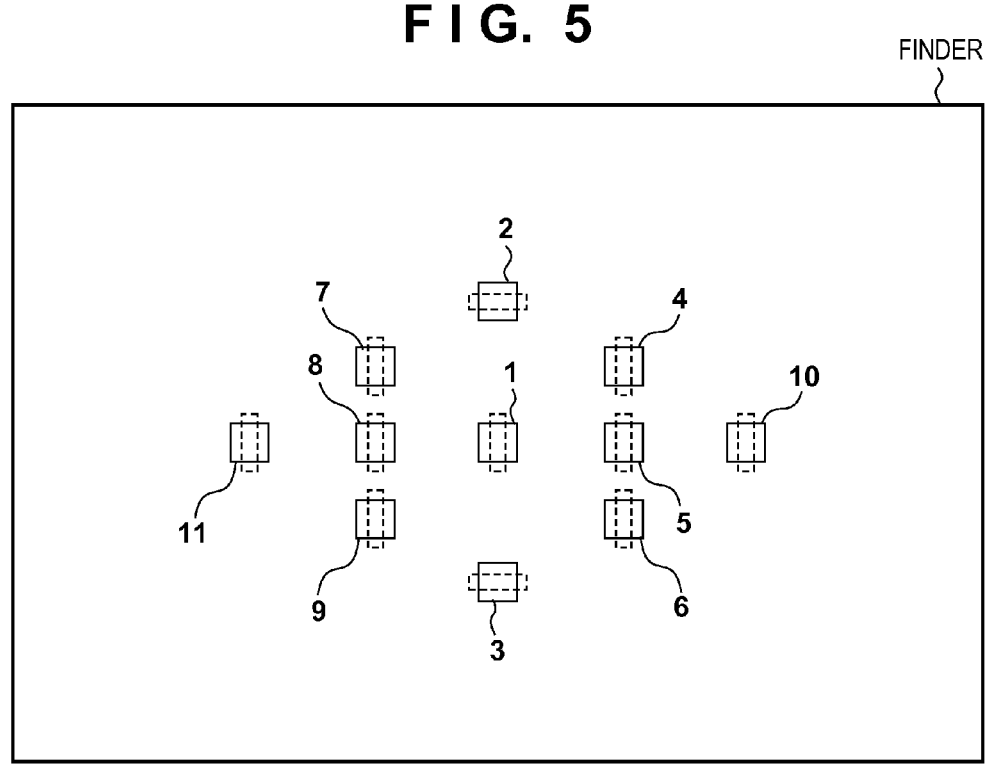
FIG. 5 is a diagram showing relationship between the line sensors and focus detection areas according to an embodiment.

FIG. 5 is a diagram showing the arrangement of the focus detection areas displayed on a finder and AF visual fields obtained by the line sensor pairs in the AF sensor 101. There are a total of 11 focus detection areas in the first embodiment, and the focus detection areas 1 to 11 correspond to the line sensor pairs 102-1 to 102-11, respectively.

Figure 6:
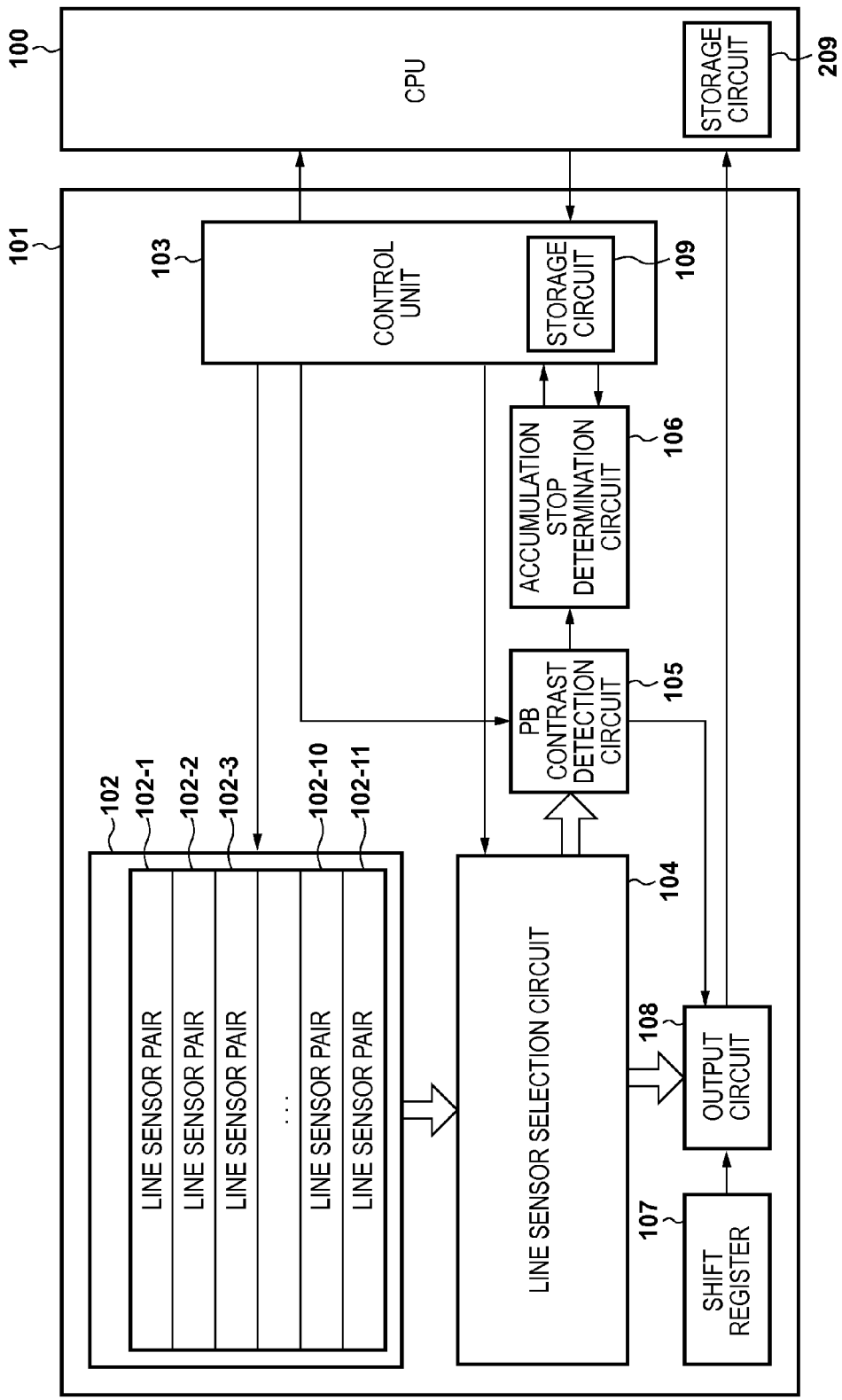
FIG. 6 is a block diagram showing a detailed circuit configuration of an AF sensor according to an embodiment.

Next, a specific circuit configuration of the AF sensor 101 will be described with reference to the block diagram in FIG. 6. A control unit 103 is connected to the CPU 100, and controls each block in the AF sensor 101 based on a control command from the CPU 100. The control unit 103 has a storage circuit 109 for storing gain information, accumulation period information, and so forth, a plurality of registers for flags for various control, registers for setting, and timers (not shown). Furthermore, the control unit 103 transmits accumulation end information, gain information, accumulation period information, and the like of the AF sensor 101 to the CPU 100.

The subject image formed by the secondary image forming lens 309 is subjected to photoelectric conversion by the line sensor group 102, which includes the line sensor pairs 102-1 to 102-11, and is accumulated as charge. The accumulated charge is output as voltage by an amplification circuit. A line sensor selection circuit 104 selects one of the plurality of line sensor pairs in the line sensor group 102. The line sensor selection circuit 104 has a function of outputting the pixel signals of the selected line sensor pair to a PB contrast detection circuit 105 that monitors an accumulation state of a feature amount (here, PB contrast) and to an output circuit 108. Further, by driving a shift register 107, the pixel signal is output from the output circuit 108 to the CPU 100 pixel by pixel.

The PB contrast detection circuit 105 outputs a PB signal that is a difference between a maximum signal (peak signal) which is the largest of the pixel signals, and a minimum signal (bottom signal) which is the smallest of the pixel signals of the line sensor pair that was selected by the line sensor selection circuit 104 and is currently monitored, to an accumulation stop determination circuit 106.

Figure 7:
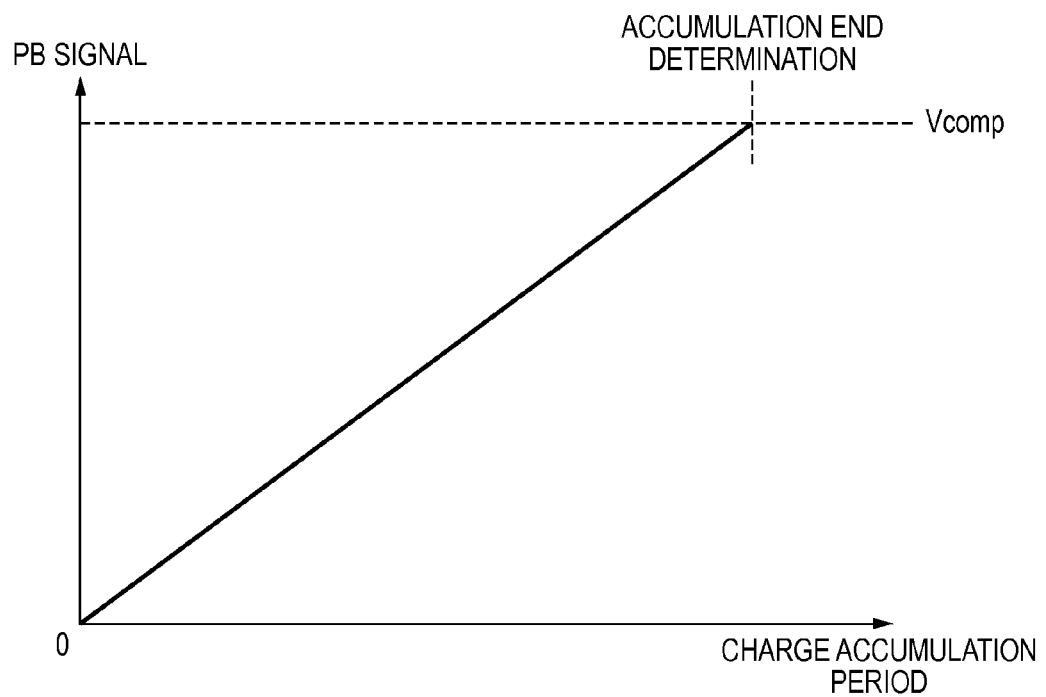
FIG. 7 is a diagram for explaining a charge accumulation period, a signal level of a PB signal, and timing of accumulation end determination.

FIG. 7 is a diagram illustrating relationship between a signal level of the PB signal which is output from the PB contrast determination circuit 105, a charge accumulation period, and timing of accumulation end determination. The charge accumulation period 0 indicates a charge start timing, and the PB signal increases as time elapses. The accumulation stop determination circuit 106 compares the PB signal and an accumulation end level Vcomp. The level of Vcomp can be changed as will be described later.

When the PB signal becomes larger than the accumulation end level Vcomp, the accumulation stop determination circuit 106 outputs an accumulation stop determination signal to the control unit 103. In turn, the control unit 103 outputs an accumulation stop signal to the line sensor group 102 to stop charge accumulation in the line sensor pair that was selected by the line sensor selection circuit 104 and is currently monitored. Further, the control unit 103 outputs to the CPU 100 an accumulation end signal and line information of the line sensor pair in which charge accumulation is ended. In a case where the PB signal does not reach a target value within a predetermined time period, the CPU 100 sends an accumulation stop command to the AF sensor 101 to forcibly stop the accumulation, and the control unit 103 then outputs an accumulation stop signal to the line sensor group 102.

Here, it is explained that the accumulation stop determination circuit 106 performs the accumulation stop determination based on the PB signal. However, the present invention is not limited to this, and the accumulation stop determination may be performed based on a PD signal which is a difference signal between the peak signal and a signal (dark signal) from a pixel shielded from light (not shown).

As described above, the pixel signals accumulated in the line sensor group 102 are output to the output circuit 108 via the line sensor selection circuit 104. The CPU 100 sends a control command for reading out pixels and the shift register 107 is driven, thereby pixel signals are output to an A/D converter (not shown) from the output circuit 108 in the CPU pixel by pixel. At this time, the output circuit 108 performs processes such as of generation of difference signals between the pixel signals and the bottom signal (i.e., extract a contrast component), and amplification of the difference signals, and so forth.

Further, the output circuit 108 can output the peak signal, the bottom signal and the PB signal obtained from the PB contrast detection circuit 105 in response to the control command from the CPU 100. Furthermore, the output circuit 108 can output the dark signal, and difference signals between the dark signal and pixel signals, the peak signal, or the bottom signal.

Figure 8:
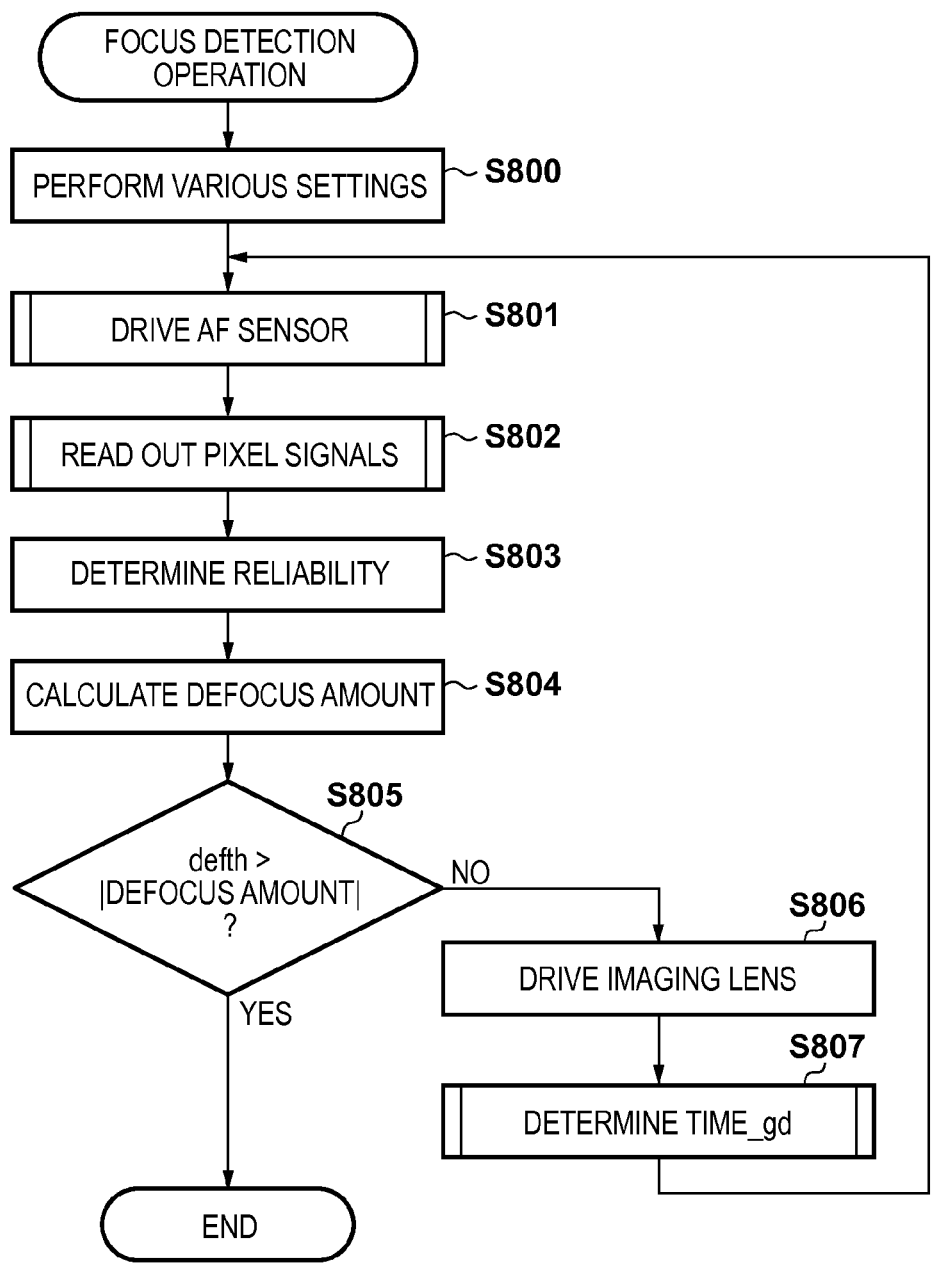
FIG. 8 is a flowchart of focus detection operation according to an embodiment.

Next, the focus detection operation according to the embodiment will be explained with reference to a flowchart shown in FIG. 8. In step S800, the CPU 100 performs various settings relating to the focus detection operation. For example, the CPU 100 communicates with the imaging lens 300 via the lens communication circuit 205 to obtain focal length information, or the like, of the imaging lens 300. Further, the CPU 100 sets a maximum charge accumulation period of the AF sensor 101 in accordance with an operation by a photographer.

In step S801, the CPU 100 controls to drive the AF sensor 101. The driving of the AF sensor 101 will be explained later in detail. In step S802, the CPU 100 reads out pixel signals obtained in response to charge accumulated in the AF sensor 101. In step S803, the CPU 100 determines whether or not the obtained pixel signals are reliable enough to be used for focus detection calculation (defocus calculation). Further, the CPU 100 also determines which of the signals respectively output from the plurality of the line sensor pairs is to be used for the focus detection calculation.

In step S804, the CPU 100 performs the focus detection calculation for detecting a focus state (a defocus amount) of the imaging lens 300 using the obtained pixel signals, and obtains the defocus amount. In step S805, the CPU 100 determines whether or not the absolute value of the defocus amount obtained in step S804 is equal to or less than the a threshold defth, and if yes (i.e., if in focus), the focus detection operation is ended.

On the contrary, if the absolute value of the defocus amount is greater than the threshold defth, the CPU 100 advances the process to step S806, where the CPU 100 drives the imaging lens 300 in accordance with the obtained defocus amount. In step S807, the CPU 100 sets a gain determination timing TIME_gd using the obtained pixel signals, gain information, and charge accumulation period information. The determination process of the gain determination timing TIME_gd performed in step S807 will be explained later.

After the gain determination timing TIME_gd is set, the CPU 100 advances the process to step S801, and the processes of steps S801 to S807 are repeated until the absolute value of the defocus amount becomes equal to or less than the threshold defth (until the in-focus state is attained).

Figure 9:
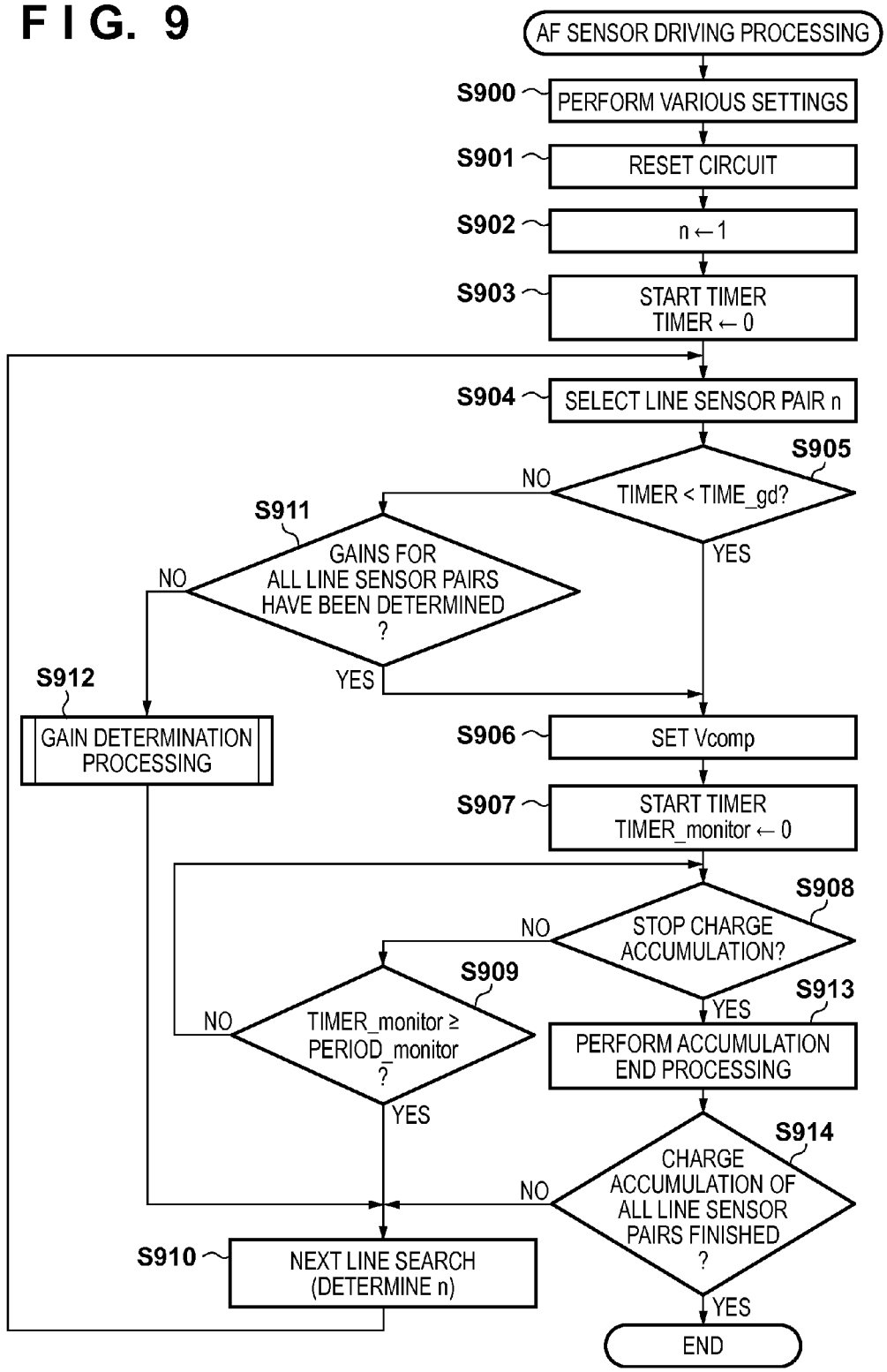
FIG. 9 is a flowchart of AF sensor driving processing according to an embodiment.

Next, the AF sensor driving processing performed in step S801 will be explained in detail. FIG. 9 is a flowchart showing a sub-routine for driving the AF sensor 101 in step S801. Performed in steps S900 to S903 are processes from initial setting operation of the AF sensor 101 and reset operation of circuits to initiation of charge accumulation. In step S900, the CPU 100 sends a control command to the AF sensor 101, and the control unit 103 perform settings on each units in accordance with the sent control command.

In step S901, the control unit 103 resets charge in photoelectric conversion elements of the line sensor pairs 102-1 to 102-11, as well as other circuits, and starts charge accumulation. In step S902, the control unit 103 sets n=1 to set the line sensor pair 102-1 as a line sensor pair to be monitored. In step S903, the control unit 103 resets and starts to count up a value TIMER of a built-in timer, thereby measurement of elapsed time since the start of charge accumulation starts.

In step S904, the control unit 103 controls the line sensor selection circuit 104 to select the line sensor pair 102-$n$ (n=1 to 11). At this time, signals from the line sensor pair 102-$n$ are output to the PB contrast detection circuit 105. In step S905, the control unit 103 compares the value TIMER and the gain determination timing TIME_gd which is determined as will be described later. Note that the gain determination timing TIME_gd is determined in step S807 in FIG. 8. Therefore, in the first routine of the focus detection operation, a predetermined timing TIME_gd1, which will be described later, is set as an initial value of the gain determination timing TIME_gd for the selected line sensor pair 102-$n$. In a case where TIMER does not reach the gain determination timing TIME_gd, the control unit 103 advances the process to step S906. Contrarily, if TIMER reaches the gain determination timing TIME_gd, then the control unit 103 advances the process to step S911.

In step S906, the control unit 103 reads out gain information (gain [n]) corresponding to the selected line sensor pair 102-$n$ from the storage circuit 109, and sets the accumulation end level Vcomp of the accumulation stop determination circuit 106 in accordance with the gain information. The gain information is obtained in gain determination process in step S912, which will be explained later, for each line sensor pair in a case where TIMER reaches the gain determination timing TIME_gd. Therefore, until TIMER reaches the gain determination timing time_gd, the control unit 103 sets a gain GAIN[n] to ×5 (five times) as an initial value for the selected line sensor pair 102-$n$. Then, a value Vcomp×5 which corresponds the gain of ×5 (five times) is set as the accumulation end level Vcomp.

In step S907, the control unit 103 resets the built-in timer (TIMER_minitor) and starts counting, thereby measurement of elapsed time of a monitor period for monitoring an accumulation state of the selected line sensor pair 102-$n$ is started. In step S908, the accumulation stop determination circuit 106 compares the PB signal of the selected line sensor pair 102-*n* with the accumulation end level Vcomp set in step S906, and if the PB signal has reached the accumulation end level Vcomp, then the process proceeds to step S913; otherwise the process goes to step S909.

In steps S909, the control unit 103 compares TIMER_monitor to a monitor period PERIOD_monitor for monitoring each line sensor pair. Until the TIMER_monitor reaches the monitor period PERIOD_monitor, the accumulation stop determination in step S908 is repeated.

If the TIMER_monitor has reached the monitor period PERIOD_monitor without stopping of charge accumulation being determined, the control unit 103 advances the process to step S910, and determines a line sensor pair to be monitored next (next line search). Basically, n is increased by one to select the line sensor pair to be monitored next; however, if charge accumulation of the next line sensor pair has been ended, n is further increased by one to determine the next line sensor pair to be monitored. After n=11, n is set to 1.

Further, if the PB signal reaches the accumulation end level Vcomp while the selected line sensor pair 102-*n* is monitored, the process proceeds to step S913 to perform accumulation end processing. In step S913, the control unit 103 performs accumulation end control and pixel signal storing control, and the value of the timer TIMER is stored as the charge accumulation period in the storage circuit 109 inside of the control unit 103.

In step S914, the control unit 103 determines whether or not charge accumulation of all the line sensor pairs is finished. If yes, the AF sensor driving processing ends, whereas if not, the control unit 103 advances the process to step S910, where the next line search is performed.

If the timer has reached the gain determination timing TIME_gd in step S905, the control unit 103 determines whether or not gains for all the line sensor pairs have been determined in step S911. If not, the process proceeds to step S912 where gain determination processing is repeated in a procedure which will be described later until the gains for all the line sensor pairs are determined.

If the gains for all the line sensor pairs have been determined, the control unit 103 advances the process to step S906. At this point, gain information (GAIN[n]) for each line sensor pair is stored in the storage circuit 109. Accordingly, in step S906, the control unit 103 reads out the gain information (GAIN[n]) corresponding to the selected line sensor pair 102-*n* from the storage circuit 109, and sets the accumulation end level Vcomp for the accumulation stop determination circuit 106 on the basis of the readout gain information. The processes after step S907 are the same as those performed when the timer TIMER has not reached the gain determination timing TIME_gd.

Next, the gain determination processing performed in step S912 will be explained with reference to FIG. 10. In step S1000, the control unit 103 sets the accumulation end level Vcomp for the accumulation stop determination circuit 106 to a predetermined value Vcomp×10. In step S1001, if it is determined based on the output from the accumulation stop determination circuit 106 that the PB signal is equal to or greater than the accumulation end level Vcomp (here, Vcomp×10), the control unit 103 advances the process to step S1009, where the gain GAIN[n] for the line sensor pair 102-*n* is set to 5 times (×5), and written to the built-in storage circuit 109.

If the PB signal is smaller than the accumulation end level Vcomp (here Vcomp×10), the process proceeds to step S1002, where the control unit 103 sets the accumulation end level Vcomp for the accumulation stop determination circuit 106 to a predetermined value Vcomp×20 which is smaller than the value Vcomp×10. In step S1003, if it is determined based on the output from the accumulation stop determination circuit 106 that the PB signal is equal to or greater than the accumulation end level Vcomp (here Vcomp×20), the control unit 103 advances the process to step S1008, where the gain GAIN[n] for the line sensor pair 102-*n* is set to 10 times (×10), and written to the built-in storage circuit 109.

If the PB signal is smaller than the accumulation end level Vcomp (here Vcomp×20), the process proceeds to step S1004, where the control unit 103 sets the accumulation end level Vcomp for the accumulation stop determination circuit 106 to a predetermined value Vcomp×40 which is smaller than the value Vcomp×20. In step S1005, if it is determined based on the output from the accumulation stop determination circuit 106 that the PB signal is equal to or greater than the accumulation end level Vcomp (here Vcomp×40), the control unit 103 advances the process to step S1007 where the gain GAIN[n] for the line sensor pair 102-*n* is set to 20 times (×20), and written to the built-in storage circuit 109. On the other hand, if the PB signal is smaller than the accumulation end level Vcomp (here Vcomp×40), the process proceeds to step S1006, where the gain GAIN[n] for the line sensor pair 102-*n* is set to 40 times (×40), and written to the built-in storage circuit 109.

As described above, the control unit 103 sets Vcomp to Vcomp×5, Vcomp×10, Vcomp×20, or Vcomp×40 in accordance with the level of the PB signal. Then, based on the comparison result between the PB signal and the set Vcomp, the gain GAIN[n] to be set for the line sensor pair 102-*n* is determined and written to the built-in storage circuit 109.

When the gain GAIN[n] for the selected line sensor pair 102-*n* is determined, the process proceeds to step S910, and the next line sensor pair to be monitored is determined as described above (next line search).

As described above, processes from steps S904 to S914 are repeated, and when the accumulation end processing for all the line sensor pairs is finished, the AF sensor driving processing ends. Although it is not shown in the drawings, when a forcible accumulation stop command is sent from the CPU 100, the control unit 103 forcibly advances the process from step S905 to S906, and from step S908 to S913, and the accumulation end processing is performed.

Figure 10:
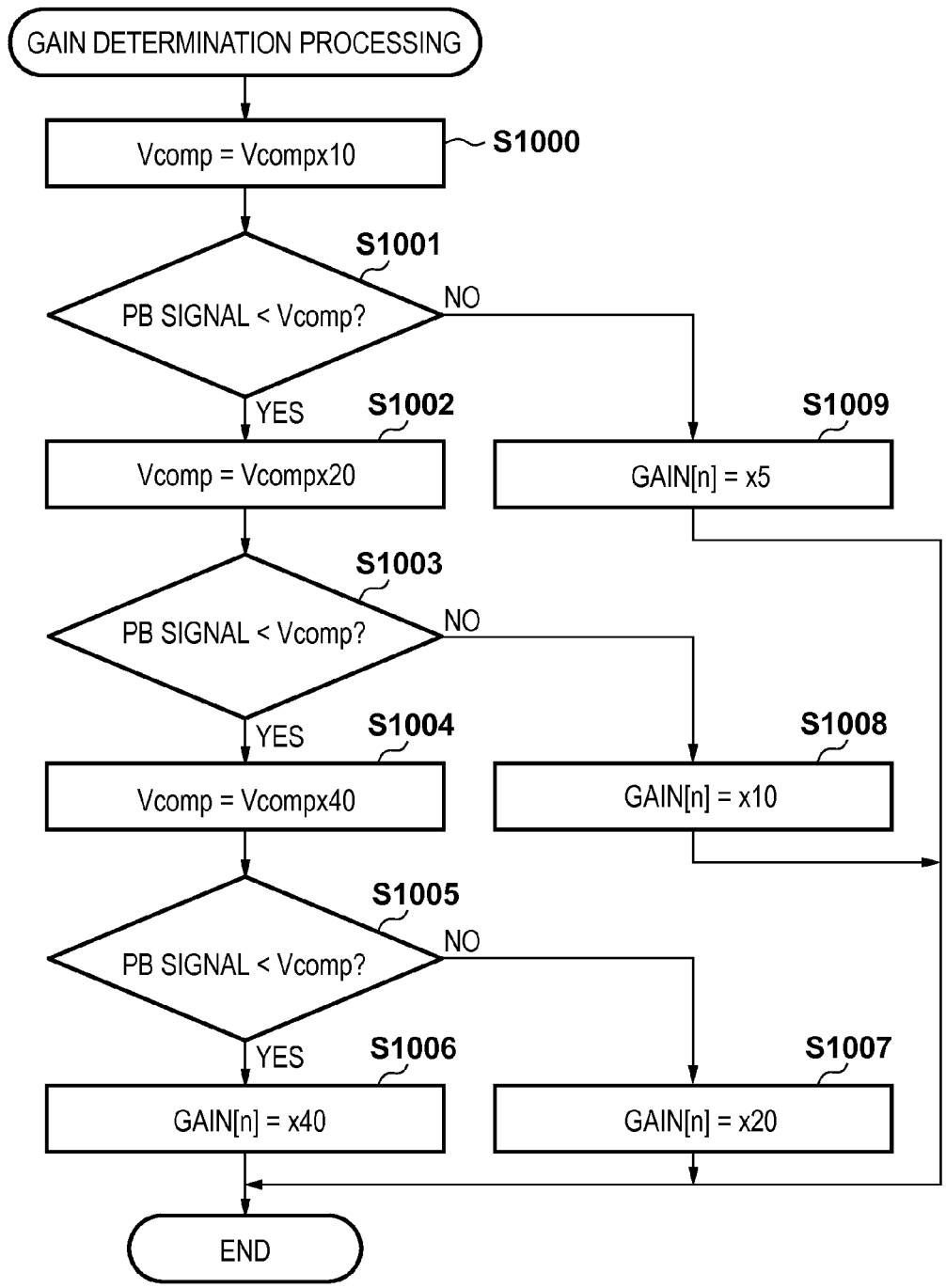
FIG. 10 is a flowchart of gain determination processing according to an embodiment.
Figure 11A:
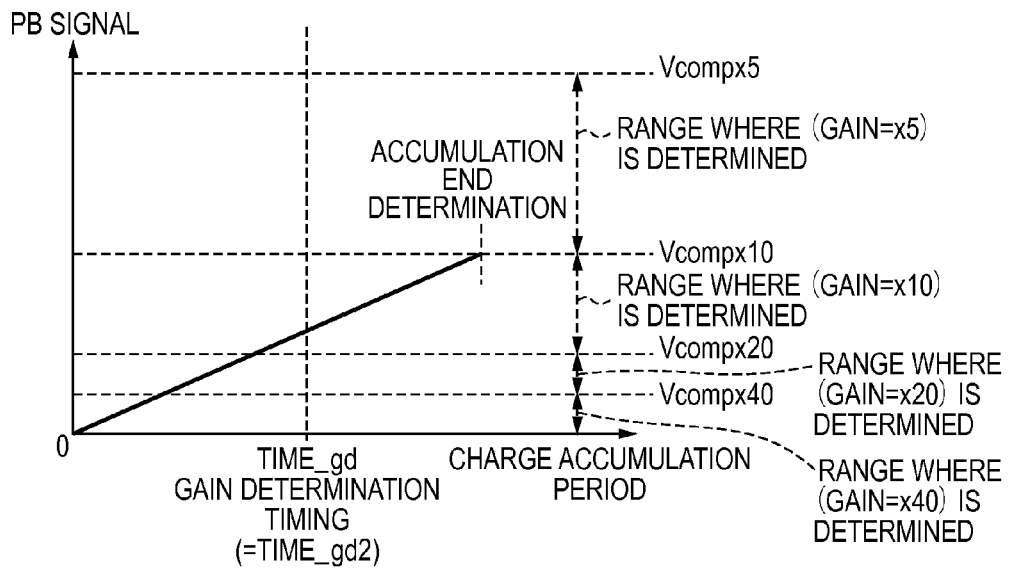
FIGS. 11A and 11B are diagrams showing examples of relationship between a gain, accumulation end level, PB signal, gain determination timing, and accumulation end determination timing.
Figure 11B:
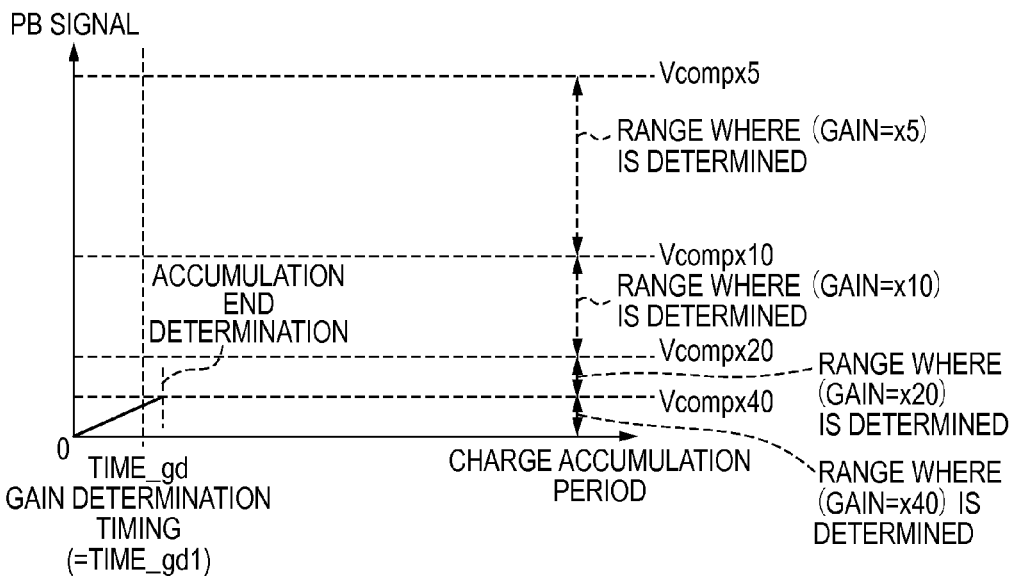

FIGS. 11A and 11B are diagrams showing examples of relationship between the gain GAIN[n] which is set in the processing shown in FIG. 10, the gain determination timing TIME_gd, and timing of accumulation end determination. In the example shown in FIG. 11A, the PB signal is in between the accumulation end levels Vcomp×10 and Vcomp×20 at the gain determination timing TIME_gd. in this case, according to the flowchart shown in FIG. 10, the control unit 103 determines the gain GAIN[n] as 10 times (×10). In step S906 in FIG. 9, the control unit 103 reads out the gain information (GAIN[n]=×10) for the line sensor pair 102-*n* from the storage circuit 109, and sets the accumulation end level Vcomp in the accumulation stop determination circuit 106 to Vcomp×10.

In the example shown in FIG. 11B, the PB signal is smaller than the accumulation end level Vcomp×40 at the gain determination timing TIME_gd. In this case, according to the flowchart shown in FIG. 10, the control unit 103 determines the gain GAIN[n] as 40 times (×40). In step S906 in FIG. 9, the control circuit 103 reads out the gain information (GAIN[n]=×40) for the line sensor pair 102-*n* from the storage circuit 109, and sets the accumulation end level Vcomp in the accumulation stop determination circuit 106 to Vcomp×40.

Note that Vcomp×5, Vcomp×10, Vcomp20 and Vcomp×40 are set so that charge accumulation is stopped at a level such that, when the pixel signals are amplified by the respective gain and output from the output circuit 108, the signals will not exceed (or saturate) the dynamic range of the output circuit 108 and an input dynamic range of the A/D converter of the CPU 100.

The lower the gain set in the gain determination is and the higher the accumulation end level is, the larger the accumulated signal amount (S) becomes and the larger the S/N ratios of obtained pixel signals become. As the S/N ratios of the obtained pixel signals increase, focus detection precision improves.

However, in a case where the luminance or contrast of a subject is low, the maximum charge accumulation period of the AF sensor 101 will elapse before the PB signal reaches the accumulation end level, and a sufficient signal amount (S) will not be obtained. For the same accumulated charge amount, the S/N ratio becomes larger by amplifying a pixel signal with a higher gain due to a quantization error by the A/D converter of the CPU 100 and an effect of implementation noise of the CPU 100 and the AF sensor.

Accordingly, the gain determination timing TIME_gd is set in consideration of a balance between the S/N ratio and a charge accumulation period (response when driving the AF sensor 101), and so forth.

Further, the gain set in the gain determination processing in step S912 is also used at the time of pixel signal readout operation performed in step S802. In a case where a control command for setting the readout gain is not sent from the CPU 100, the control unit 103 reads out the gain GAIN[n] from the storage circuit 109 at the time of outputting the pixels signals, and sets it as a readout gain in the output circuit 108.

Figure 12:
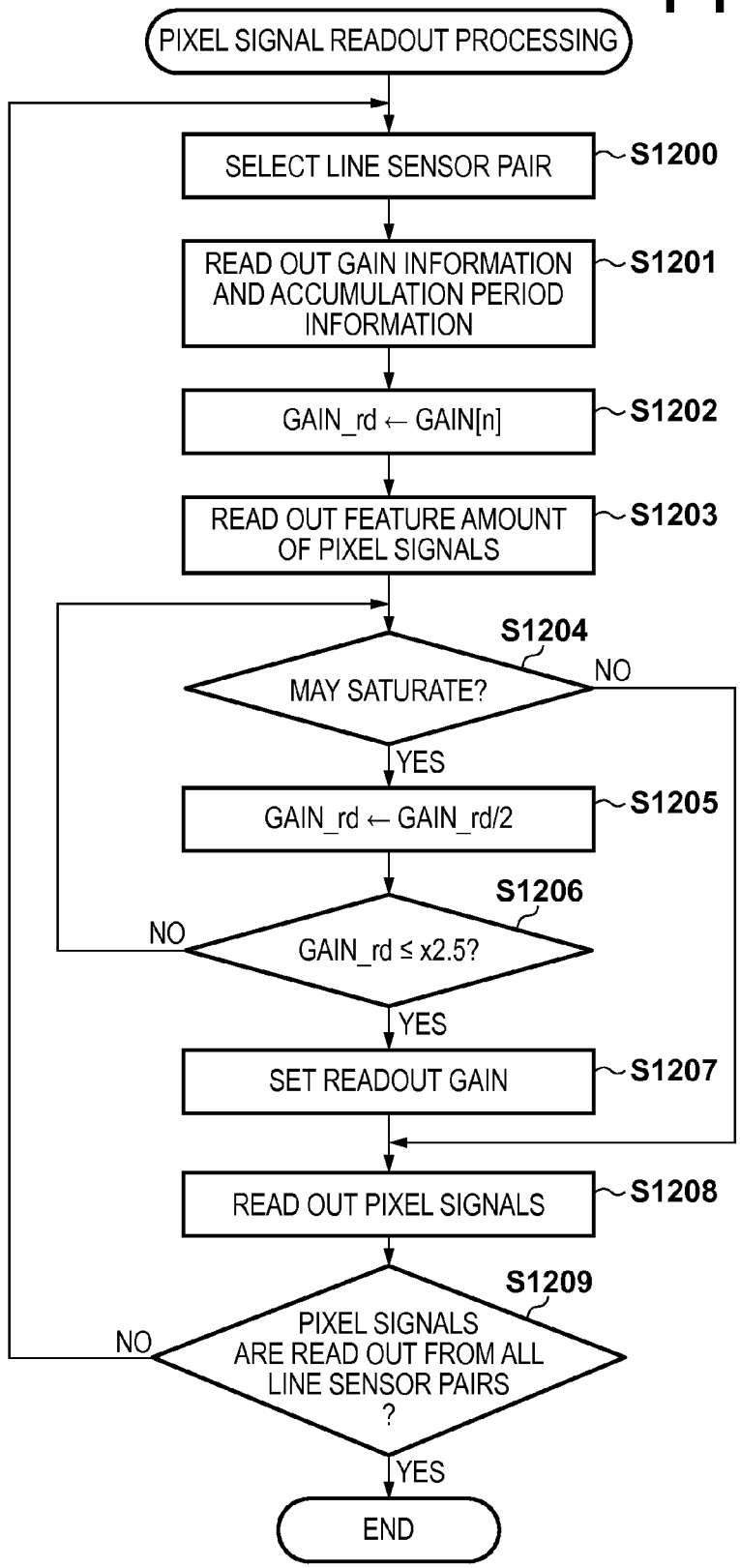
FIG. 12 is a flowchart of pixel signal readout processing according to an embodiment.

Next, the pixel signal readout processing performed in step S802 will be explained in detail with reference to a flowchart of FIG. 12. In step S1200, the CPU 100 selects the line sensor pair 102-n from which pixel signals are to be read out, and sends a command for selecting a line sensor pair to the AF sensor 101. The control unit 103 of the AF sensor 101 controls the line sensor selection circuit 104 to select the line sensor pair 102-n.

In step S1201, the CPU 100 reads out the gain information and accumulation period information of the selected line sensor pair 102-n from the AF sensor 101. The gain information corresponds to the value (GAIN[n]) set for each line sensor pair in the gain determination processing in step S912. The accumulation period information is used in the determination processing of TIME_gd, which will be explained later, performed in step S807. Then, in step S1202, the CPU 100 sets the gain information GAIN[n] read out from the AF sensor 101 as the GAIN_rd to be used at the time of reading out the pixel signals.

In step S1203, the CPU 100 reads out a feature amount of the pixel signals. Here, the feature amount of the pixel signals is the PB signal of the selected line sensor pair. However, the feature amount is not limited to the PB signal, and may be a peak signal and bottom signal of the selected line sensor pair. Or the feature amount may be difference signals between the peak signal and a signal (dark signal) output from a pixel shielded from light, or between the bottom signal and the dark signal.

The CPU 100 sends the control command for reading out the feature amount to the AF sensor 101. The control unit 103 controls the PB contrast detection circuit 105 and the output circuit 108 based on the received command, and the AF sensor 101 sends the PB signal to the CPU 100. At this time, a low gain is set to the output circuit 108 so that the PB signal does not saturate. Here, it is assumed that the gain for outputting the feature amount is 2.5 times (×2.5).

In step S1204, the CPU determines whether or not any of the pixel signals may saturate in a case where the pixel signals are read out with the GAIN_rd set in step S1202 in accordance with the feature amount read out in step S1203. In this step, the PB signal is converted to a value when it is output with GAIN_rd using a ratio between the gain (2.5 times) at the time of outputting the feature amount and GAIN_rd to be used at the time of reading the pixel signals. Whether or not the pixel signals will saturate is determined by determining whether or not the converted PB signal exceeds the upper limit of input voltage (e.g., 3.2V) of the A/D converter of the CPU 100. Since the peak signal which is a base signal of the PB signal is the largest of the pixel signals output from the line sensor pair, by performing saturation determination based on the PB signal, it is possible to determined whether or not any of the pixel signals may saturate.

If it is determined that any of the pixel signals may saturate, the CPU 100 advances the process to step S1205, whereas if it is determined that no pixel signal will saturate, the CPU 100 advances the process to step S1208. In step S1205, the CPU 100 halves the readout gain GAIN_rd.

In step S1206, the CPU 100 determines the readout gain GAIN_rd. If the GAIN_rd is smaller than the minimum gain (here 2.5 times) that can be set in the AF sensor 101, the CPU 100 advances the process to step S1207. On the contrary, if the GAIN_rd exceeds ×2.5 (2.5 times), the CPU 100 advances the process to step S1204, and the saturation determination is repeated according to the flowchart.

Note that the reason for not setting the gain to 2.5 times in the gain determination process in step S912 is to shorten the accumulation period. The accumulation end level Vcomp for reading out with the gain ×2.5 is twice as large as Vcomp×5. In other words, as shown in FIGS. 11A and 11B, in order to set a lower gain, it takes a longer charge accumulation period until the PB signal reaches the accumulation end determination level. Therefore, according to the embodiment, the minimum gain upon resetting the readout gain is made different from a gain set in the gain determination processing, thereby realizing reduction of the charge accumulation period and precision at the same time.

In step S1207, the CPU 100 sends a command to set the GAIN_rd determined in steps S1204 to S1206 to the AF sensor 101. However, if saturation has not been determined in step S1204 even once, the process in step S1207 is not performed. This is because, in a case where a command to set a readout gain is not sent from the CPU 100, the AF sensor 101 amplifies the pixel signals with the gain determined in the gain determination process in step S912 and outputs the amplified pixel signals.

In step S1208, the CPU 100 controls the AF sensor 101 to readout the pixel signals from the selected line sensor pair 102-n. In step S1209, the control unit 103 determines whether or not pixel signals are read out from all the line sensor pairs, and if not, the process returns to step S1200, the next sensor pair is selected, and the above processes are repeated. On the contrary, if pixel signals are read out from all the line sensor pairs, the image signal readout processing is ended.

FIG. 13A shows an example where some of pixel signals are saturated when they are read out with a gain (GAIN[n])

(10 times, for example) set in the gain determination processing in step S912. The original image signal (shown by a broken line) is clipped at the upper limit of the input voltage range of the CPU 100 or of the output voltage range of the output circuit 108.

When the same pixel signals are read out with the GAIN_rd (5 times, for example) that is reset in steps S1204 to S1206, the resultant image signal is as shown in FIG. 13B. Thus, it is possible to read out the pixel signals without any of the pixel signals being saturated. Further, if part of the plurality of pixels in a pixel unit of the AF sensor 101 is saturated, saturation due to the input voltage range of the CPU 100 and the output voltage range of the output circuit 108 can be restrained, thereby reducing the effect to the focus detection precision.

Further, if saturation is determined using pixel signals, it is necessary to read out all the pixels, which requires a long processing time. In contrast, according to the present invention, only the feature amount is read out to determine presence of a saturated signal before reading out pixel signals, it is possible to shorten time taken for readout.

After reading pixel signals in step S802 as described above, the CPU 100 determines reliability of the pixel signals in step S803. In determination, a contrast of the subject, for example, is calculated from the pixel signals, and if the contrast is lower than a predetermined value (reliability judgment threshold), then it is determined that the pixel signals are not reliable. However, as shown in FIG. 13B, a signal read out after resetting the gain has a smaller amplitude, and it is judged that the contrast is low. Accordingly, the reliability judgment threshold applied to the signal read out after the gain is reset is changed to a value suitable for judging the reliability on the basis of the read gain information and charge accumulation period.

Next, the determination processing of the gain determination timing TIME_gd performed in step S807 will be explained in detail with reference to FIG. 14. In step S807, the CPU 100 determines whether to set TIME_gd1 or TIME_gd2 as the gain determination timing TIME_gd based on the pixel signals which are determined to be reliable in step S803 and used for calculating the defocus amount from viewpoints of focus detection precision and responsiveness. Note, TIME_gd1 is smaller than TIME_gd2.

Figure 15A:
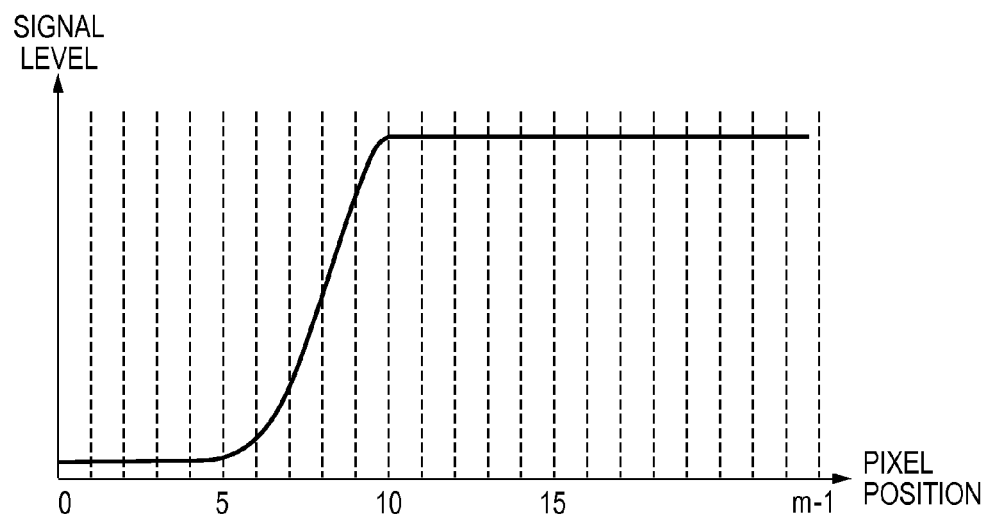
FIGS. 15A and 15B are diagrams for explaining difference in sharpness of a subject.
Figure 15B:
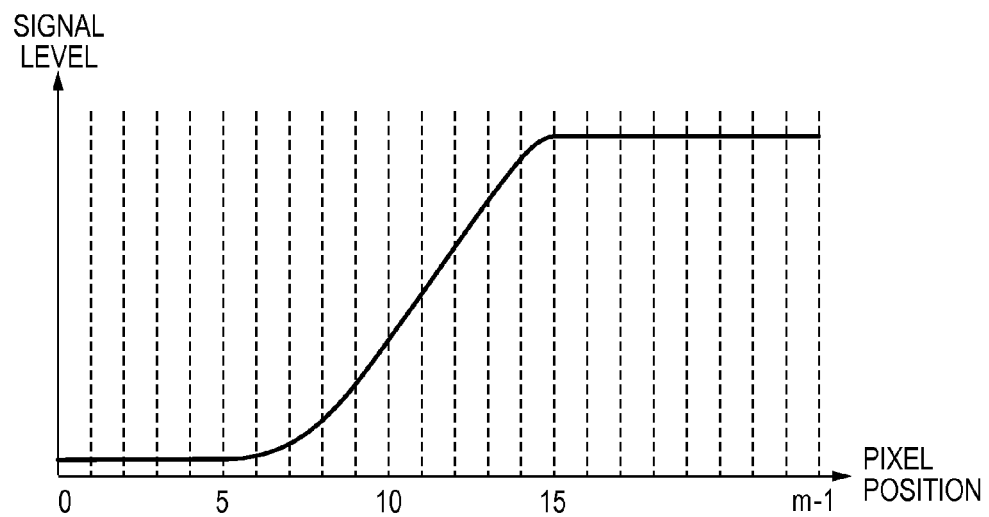

In step S1400, the CPU 100 calculates sharpness of the subject from the obtained pixel signals. The sharpness will be described in detail with reference to FIGS. 15A and 15B. FIGS. 15A and 15B show examples of pixel signals that the CPU 100 reads out from the AF sensor 101. Here, images obtained from one of the line sensor pair are shown for the sake of simplifying the explanation. In FIGS. 15A and 15B, the abscissa indicates a pixel position, and the ordinate indicates the pixel signal level. FIG. 15A shows an example of pixel signals with high sharpness, and FIG. 15B shows an example of pixel signals with low sharpness.

The amplitudes (contrast) of the pixel signals shown in FIGS. 15A and 15B are the same, however, the change in signal level shown in FIG. 15A is steep, and the change in signal level shown in FIG. 15B is gentle. Therefore, it can be said that the sharpness of the pixel signals shown in FIG. 15A is higher than that shown in FIG. 15B.

In order to quantitatively calculate the sharpness, the following formulas (1), (2) and (3) are used, for example.

$$1^{st} \text{ Order Contrast} = \sum_{i=0}^{m-1} |A(i) - A(i+1)| \quad (1)$$

$$2^{nd} \text{ Order Contrast} = \sum_{i=0}^{m-1} |A(i) - A(i+1)|^2 \quad (2)$$

$$\text{Sharpness} = (2^{nd} \text{ order contrast}) / (1^{st} \text{ Order Contrast}) \quad (3)$$

Calculated with the formula (1) is the sum of the differences between pixel signals from adjoining pixels from the 0-th pixel to the (m−1)-th pixel, and calculated with the formula (2) is the sum of squares of the differences between pixel signals from adjoining pixels from the 0-th pixel to the (m−1)-th pixel. Calculated with the formula (3) is a ratio of the $2^{nd}$ order contrast calculated with the formula (2) to the $1^{st}$ order contrast calculated with the formula (1). The gentler the change in signal level is, the smaller a value calculated with the formula (3) which shows the sharpness becomes. If the amplitudes (contrast) of pixel signals are same, a lower sharpness causes lower focus detection precision and larger focus detection error.

In step S1401, the CPU 100 determines whether the value of the sharpness calculated in step S1400 is equal to or less than a predetermined value Sth. If yes, the CPU 100 advances the process to step S1402. Contrarily, if the value of the sharpness is greater than the predetermined value Sth, the CPU 100 advances the process to S1405, and sets the gain determination timing TIME_gd to TIME_gd1.

In step S1402, the CPU 100 determines whether or not the charge accumulation period is equal to or shorter than a predetermined period Tth. If yes, the CPU 100 advances the process to step S1403. Contrarily, if the accumulation period is longer than the predetermined period Tth, the CPU 100 advances the process to step S1405, and sets the gain determination timing TIME_gd to TIME_gd1.

In step S1403, the CPU 100 determines whether or not the gain GAIN[n] set in the gain determination processing is equal to or greater than a predetermined value Gth. This determination is equivalent to the determination using the accumulation end level set in the gain determination processing. If the gain GAIN[n] is equal to or greater than the predetermined value Gth, the CPU 100 advances the process to step S1404, and sets the gain determination timing TIME_gd to TIME_gd2. Contrarily, if the gain GAIN[n] is smaller than the predetermined value Gth, the CPU 100 advances the process to step S1405, and sets the gain determination timing TIME_gd to TIME_gd1.

Next, the difference between the results of gain determination processing due to the difference between the gain determination timing will be explained in detail with reference to FIGS. 11A and 11B. In the example shown in FIG. 11B, the PB signal is smaller than Vcomp×40 at the time TIME_gd1. Therefore, according to the flowchart of FIG. 10 as described above, the control unit 103 determines the gain GAIN[n] as 40 times (×40). In step S906 in FIG. 9, the control unit 103 reads out the gain information (GAIN[n]= 40 times) from the storage circuit 109, and sets Vcomp×40 to the accumulation end level Vcomp of the accumulation stop determination circuit 106.

In contrast, in FIG. 11A, the PB signals is in between Vcomp×10 and Vcomp×20 at the time TIME_gd2. According to the flowchart of FIG. 10 as described above, the control unit 103 determines the gain GAIN[n] as 10 times (×10). Namely, as shown in FIGS. 11A and 11B, by elongating the gain determination timing TIME_gd, it is possible to set a low gain. In step S906 in FIG. 9, the control unit 103 reads out the gain information (GAIN[n]=10 times) from the storage circuit 109, and sets Vcomp×10 to the accumulation end level Vcomp of the accumulation stop determination circuit 106.

According to the processing as described above, the gain determination timing TIME_gd is set to TIME_gd2 in a case where sharpness a subject is low even if the subject is bright, thus the accumulation end level Vcomp becomes high, and more charge can be accumulated. Consequently, the S/N ratio of the obtained signal becomes high, which realizes focus detection with high precision.

Figure 14:
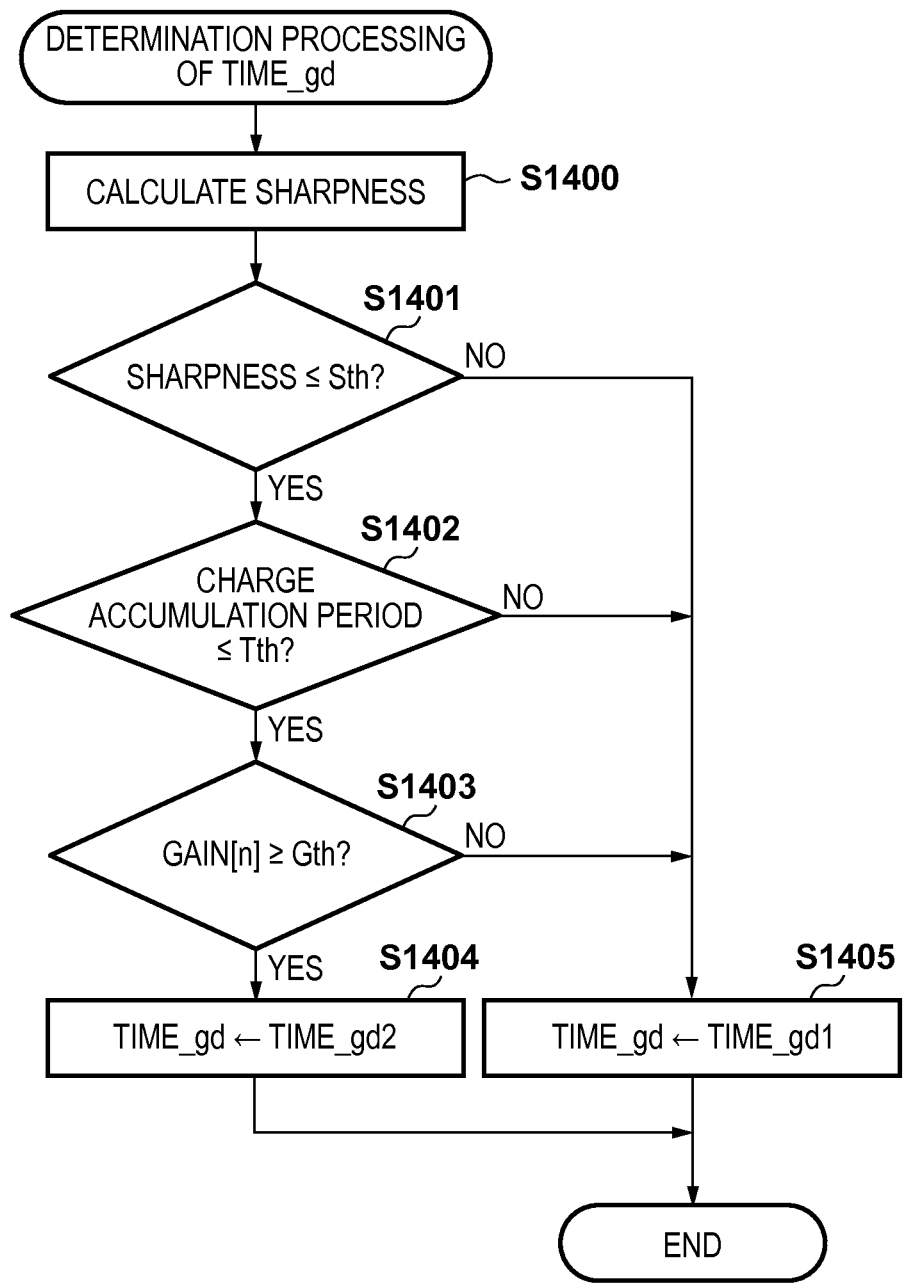
FIG. 14 is a flowchart of determination processing of gain determination timing.

Note that, in the processing shown in FIG. 14, the reason for judging the charge accumulation period in step S1402 is to distinguish a case where calculated sharpness becomes low due to the low luminance or low contrast of the subject. Further, by judging the gain in step S1403, it is controlled such that the gain determination timing TIME_gd is kept short if the gain is set low even if the sharpness is low.

Next, the relationship between the luminance of a subject, a gain set in the gain determination processing, and a focus detection error is explained with reference to FIGS. 16A to 16C. For the sake of simplicity of explanation, it is assumed that the pixel signals are not saturated, and a gain is not reset in step S802.

Figure 16A:
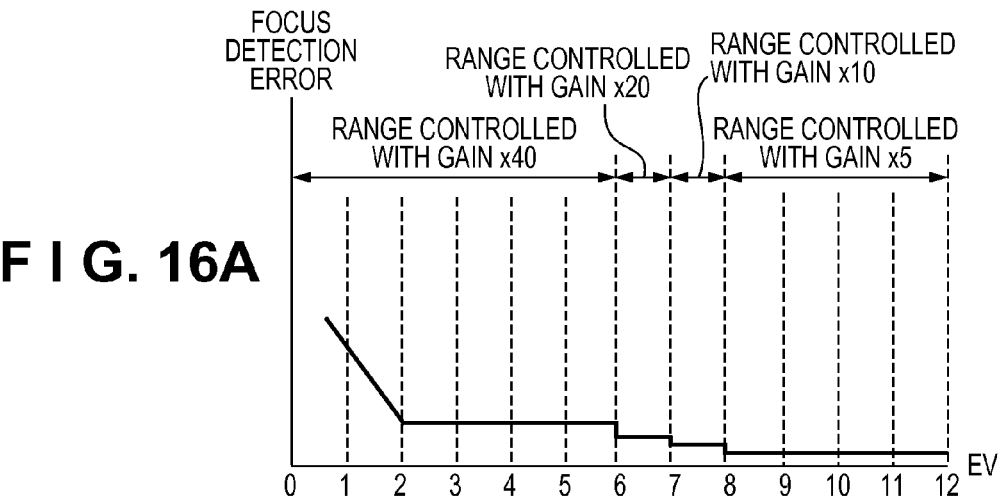
FIGS. 16A to 16C are diagrams showing relationship between luminance of subject, gain, and focus detection error.

FIG. 16A shows a relationship between the luminance of a subject and a focus detection error, assuming that the subject is the same as that shown in FIG. 15A, with the gain determination timing TIME_gd being set to TIME_gd1. Note that the unit of the luminance of the subject is shown by a EV value converted with the ISO sensitivity of 100.

As described above, a gain to be used for reading out pixel signals are set based on a gain obtained at the gain determination timing TIME_gd, and the luminance and contrast (PB signal) of a subject. In a luminance range which is brighter than EV2, the charge accumulation will not be forcibly stopped and the signals reaches the accumulation end level Vcomp, and thus the focus detection error increases as a lower gain is set. Further, in a luminance range which is darker than EV2, the accumulation end determination is not performed within the maximum accumulation period and charge accumulation is forcibly stopped. Accordingly, pixel signals decrease as the luminance decreases, and the focus detection error increases.

Figure 16B:
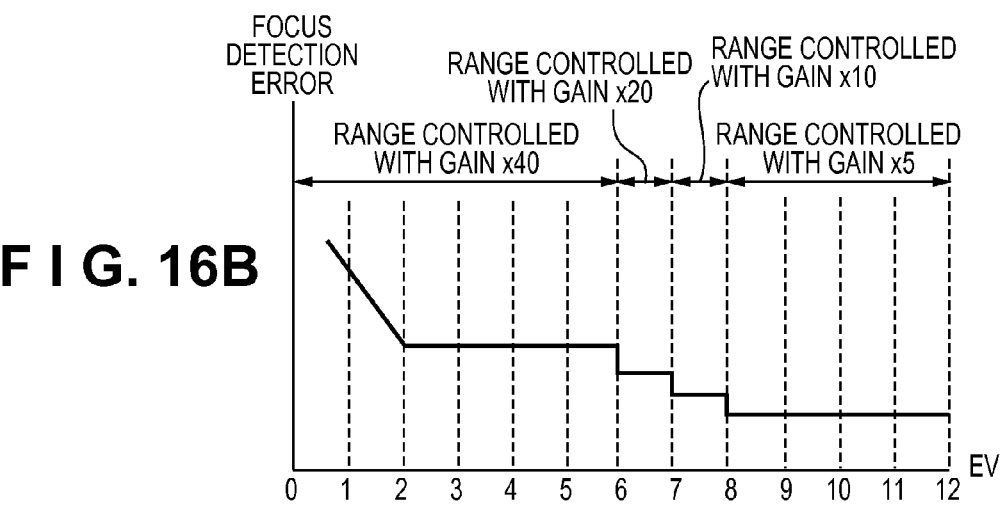

FIG. 16B shows a relationship between the luminance of a subject and a focus detection error, assuming that the subject is the same as that shown in FIG. 15B, with the gain determination timing TIME_gd being set to TIME_gd1. FIG. 15B shows the subject whose sharpness is lower than the subject shown in FIG. 15A, the focus detection error is greater in the case of FIG. 16B than in the case of FIG. 16A.

Figure 16C:
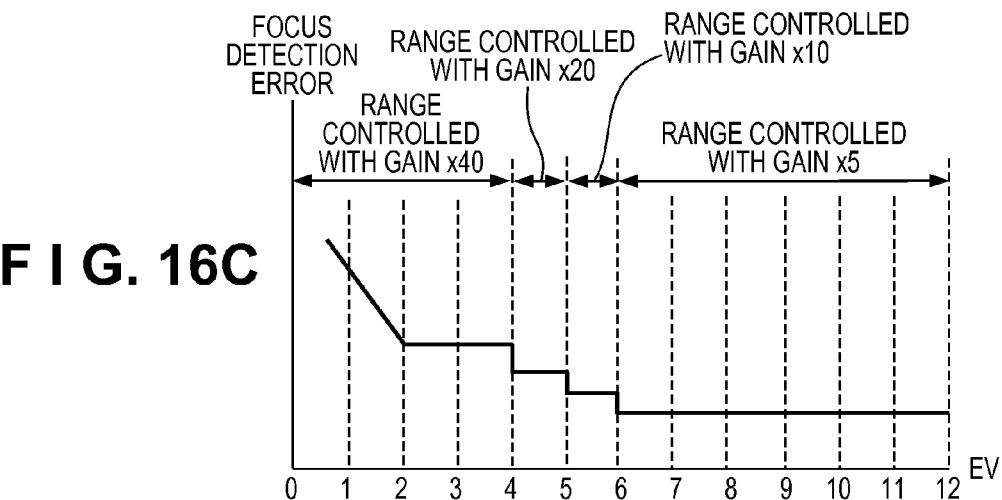

FIG. 16C shows a relationship between the luminance of a subject and a focus detection error, assuming that the subject is the same as that shown in FIG. 15B, with the gain determination timing TIME_gd being set to TIME_gd2. Since the gain determination timing TIME_gd comes later than the case shown in FIG. 16B, a lower gain is set compared to the case of FIG. 16B. Accordingly, it is possible to obtain high focus detection precision in the luminance range from EV4 to EV8. However, as the charge accumulation period becomes longer in this luminance range, responsiveness when driving the AF sensor 101 decreases.

According to the embodiment of the present invention, in a case where it is determined that a subject is of low sharpness which causes low focus detection precision, by delaying the gain determination timing, the signal level which will be obtained is increased. As a result, it is possible to perform focus detection with high precision.

Further, according to the embodiment of the present invention, a feature amount of pixel signals of accumulated charge is read out, and the determination on saturation at the time of reading out pixel signals using a gain set by the gain determination processing is performed. The gain may be reset in accordance with the determination result, thereby an appropriate gain is set and pixel signals are read out. As a result, it is possible to reduce the saturation of pixel signals.

Note that in the embodiment of the present invention, it is explained that the control is made on the basis of a difference signal between the peak signal and the bottom signal, however, the dark signal may be used instead of the bottom signal.

Further, the numbers of options which can be set to the gain, the accumulation end level, and the gain determination timing are not limited to the above, and can be increased or decreased as appropriate. Furthermore, in the above embodiment, discrete values are used as options for the gain, the accumulation end level, and the gain determination timing, however, continuous values may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-070085, filed on Mar. 28, 2014 which is hereby incorporated by reference herein in its entirety.

What is claimed is:

1. A focus detection apparatus comprising:
a sensor unit, having a plurality of photoelectric conversion elements for receiving light that passed through an imaging optical system and accumulating charge, configured to generate an image signal to be used for correlation calculation for focus detection based on the accumulated charge;
a control unit configured to control the photoelectric conversion elements to stop charge accumulation in a case where a first signal that represents contrast of the image signal reaches a predetermined voltage level; and
a voltage level setting unit configured to set the predetermined voltage level,
wherein the voltage level setting unit sets a larger voltage level as the predetermined voltage level in a first case, in which luminance change in a direction of the correlation calculation in the plurality of the photoelectric conversion elements is gentler than a second case, than in the second case.

2. The focus detection apparatus according to claim 1, further comprising an amplification unit configured to amplify the image signal generated by the sensor unit,
wherein the first signal represents the contrast of the image signal amplified by the amplification unit.

3. The focus detection apparatus according to claim 2, further comprising a gain setting unit configured to set a gain for the image signal in the amplification unit,
wherein the gain setting unit sets a smaller gain in the first case than in the second case.

4. The focus detection apparatus according to claim 3, further comprising a time setting unit configured to set a period of time since the charge accumulation in the photoelectric conversion elements is started until the gain is set by the gain setting unit,
wherein the time setting unit sets a longer period time in the first case than in the second case.

5. The focus detection apparatus according to claim 4, wherein the gain setting unit sets the gain in accordance with a voltage level of the first signal at a time when the period of time set by the time setting unit has elapsed since the charge accumulation in the photoelectric conversion elements is started.

6. The focus detection apparatus according to claim 4, wherein the voltage level setting unit sets the predetermined voltage level in accordance with a voltage level of the first signal at a time when the period of time set by the time setting unit has elapsed since the charge accumulation in the photoelectric conversion elements is started.

7. The focus detection apparatus according to claim 3, further comprising a readout unit configured to read out the image signal amplified by the amplification unit,
wherein the control unit controls the charge accumulation in the photoelectric conversion elements in accordance with the first signal that is based on the image signal amplified by a first gain, and the readout unit reads out the image signal amplified by a second gain that is smaller than the first gain in a case where a voltage level of the first signal that is based on the image signal amplified by the first gain exceeds a predetermined threshold.

8. The focus detection apparatus according to claim 7, further comprising a focus detection unit configured to perform the correlation calculation using the image signal read out by the readout unit and detect a defocus amount.

9. The focus detection apparatus according to claim 8, wherein the focus detection unit determines reliability of the image signal read out by the readout unit, and a threshold used for the determination of reliability changes depending on a gain used upon reading out the image signal by the readout unit.

10. The focus detection apparatus according to claim 1, further comprising a calculation unit configured to calculate an evaluation value representing a ratio between a sum total of squares of luminance differences between adjoining photoelectric conversion elements and a sum total of the luminance differences between the adjoining photoelectric conversion elements,
wherein the voltage level setting unit changes the predetermined voltage level depending on the evaluation value calculated by the calculation unit.

11. A focus detection apparatus comprising:
a sensor unit, having a plurality of photoelectric conversion elements for receiving light that passed through an imaging optical system and accumulating charge, configured to generate an image signal to be used for correlation calculation for focus detection based on the accumulated charge;
an amplification unit configured to amplify the image signal generated by the sensor unit;
a control unit configured to control the photoelectric conversion elements to stop charge accumulation in a case where a first signal that represents contrast of the image signal amplified by the amplification unit reaches a predetermined voltage level; and
a gain setting unit configured to set a gain for the image signal in the amplification unit,
wherein the gain setting unit sets a smaller gain in a first case, in which luminance change in a direction of the correlation calculation in the plurality of photoelectric conversion elements is gentler than a second case, than in the second case.

12. The focus detection apparatus according to claim 11, further comprising a voltage level setting unit configured to set the predetermined voltage level,
wherein the voltage level setting unit sets a larger voltage level as the predetermined voltage level in the first case than in the second case.

13. The focus detection apparatus according to claim 11, further comprising a time setting unit configured to set a period of time since the charge accumulation in the photoelectric conversion elements is started until the gain is set by the gain setting unit,
wherein the time setting unit sets a longer period time in the first case than in the second case.

14. The focus detection apparatus according to claim 13, wherein the gain setting unit sets the gain in accordance with a voltage level of the first signal at a time when the period of time set by the time setting unit has elapsed since the charge accumulation in the photoelectric conversion elements is started.

15. The focus detection apparatus according to claim 13, wherein the voltage level setting unit sets the predetermined voltage level in accordance with a voltage level of the first signal at a time when the period of time set by the time setting unit has elapsed since the charge accumulation in the photoelectric conversion elements is started.

16. The focus detection apparatus according to claim 11, further comprising a readout unit configured to read out the image signal amplified by the amplification unit,
wherein the control unit controls the charge accumulation in the photoelectric conversion elements in accordance with the first signal that is based on the image signal amplified by a first gain, and the readout unit reads out the image signal amplified by a second gain that is smaller than the first gain in a case where a voltage level of the first signal that is based on the image signal amplified by the first gain exceeds a predetermined threshold.

17. The focus detection apparatus according to claim 16, further comprising a focus detection unit configured to perform the correlation calculation using the image signal read out by the readout unit and detect a defocus amount.

18. The focus detection apparatus according to claim 17, wherein the focus detection unit determines reliability of the image signal read out by the readout unit, and a threshold used for the determination of reliability changes depending on a gain used upon reading out the image signal by the readout unit.

19. The focus detection apparatus according to claim 12, further comprising a calculation unit configured to calculate an evaluation value representing a ratio between a sum total of squares of luminance differences between adjoining photoelectric conversion elements and a sum total of the luminance differences between the adjoining photoelectric conversion elements,
wherein the voltage level setting unit changes the predetermined voltage level depending on the evaluation value calculated by the calculation unit.

20. A focus detection method comprising:
a generation step of generating an image signal to be used for correlation calculation for focus detection based on charge accumulated in a plurality of photoelectric conversion elements for receiving light that passed through an imaging optical system and accumulating charge;
a control step of controlling the photoelectric conversion elements to stop the charge accumulation in a case where a first signal that represents contrast of the image signal reaches a predetermined voltage level; and a voltage level setting step of setting the predetermined voltage level, wherein the voltage level setting step sets a larger voltage level as the predetermined voltage level in a first case, in which a luminance change in a direction of the correlation calculation in the plurality of photoelectric conversion elements is gentler than a second case, than in the second case.

21. A focus detection method comprising:

a generation step of generating an image signal to be used for correlation calculation for focus detection based on charge accumulated in a plurality of photoelectric conversion elements for receiving light that passed through an imaging optical system and accumulating charge;

an amplification step of amplifying the image signal generated in the generation step;

a control step of controlling the photoelectric conversion elements to stop the charge accumulation in a case where a first signal that represents contrast of the image signal amplified in the amplification step reaches a predetermined voltage level; and a gain setting step of setting a gain for the image signal to be used in the amplification step, wherein the gain setting step sets a smaller gain in a first case, in which a luminance change in a direction of the correlation calculation in the plurality of photoelectric conversion elements is gentler than a second case, than in the second case.

* * * * *